United States Patent Office 3,163,670
Patented Dec. 29, 1964

3,163,670
AROMATIC p,p'-DIORTHOPHOSPHORIC ACID MONOESTERS
Hans Rosenmund, Biberlinstrasse 25, Zurich, Switzerland, and Ernst Zaugg, Dittingerstrasse 33, Basel, Switzerland
No Drawing. Filed July 3, 1961, Ser. No. 121,386
Claims priority, application Switzerland July 9, 1960
3 Claims. (Cl. 260—461)

The invention relates to new phosphoric acid compounds and their production.

The present invention provides phosphoric acid esters and their salts of general Formula I

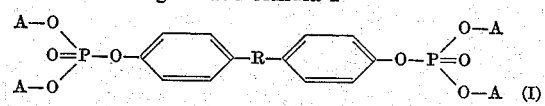

in which R signifies a divalent, straight chain, saturated hydrocarbon radical having 4 to 10 carbon atoms, and A signifies a hydrogen atom for a cation, with the proviso that not all the symbols A need be alike.

The compounds of Formula I are new. Preferred compounds of Formula I are those in which R signifies a divalent straight hydrocarbon chain of 4 to 10 carbon atoms.

The present invention also provides a process for the production of compounds I, characterized in that an acid tetrahalide of general Formula III

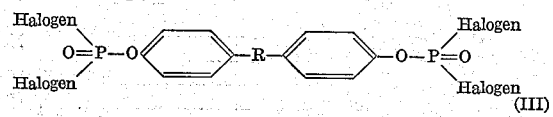

in which R has the above significance, is hydrolysed and, when a salt is to be produced, the resulting acid ester is salified with an organic or inorganic base.

To produce a compound of Formula III, a p,p'-dihydroxy compound of general Formula II,

in which R has the above significance, is phosphorylated by reacting with a phosphorus oxyhalide.

One method of producing a compound III is effected as follows: A compound of general Formula II, e.g., p,p'-dihydroxydiphenyl-n-hexane, is heated under anhydrous conditions, preferably with an excess of phosphorus oxychloride or -bromide. The reaction may, however, also be performed in the presence of an organic tertiary base, for example pyridine or quinoline.

The dihydroxy compounds of general Formula II, in which the R divalent radical signifies a straight polymethylene chain containing 4 to 10 carbon atoms, may be obtained by condensing the corresponding dicarboxylic acid dichloride with methoxy benzene in the presence of a catalyst, e.g., aluminum chloride, according to the Friedel-Crafts method, the resulting dioxo compound being reduced according to Clemmensen and the resulting dimethoxy compound converted to a dihydroxy compound according to methods known per se.

The working up and purification of the compounds of Formula III may be effected by distilling off the excess phosphorus oxyhalide and fractionating the residue, if necessary, at reduced pressure or recrystallizing the residue. The hydrolysis of the compound III to give the end product I is effected with water.

The end products may be purified by means of their salts with an alkaline earth metal, lead or copper, e.g., by heating their aqueous solution with a concentrated aqueous calcium acetate solution.

The esters of general Formula I are purified by known methods.

At room temperature the free acids I are solid and crystalline; in the absence of moisture they are stable and not hygroscopic. They readily dissolve in water and lower alcohols. In the infra red spectrum they show characteristic absorption bands at 1210, 1170, 1030 to 1060 and 980 cm.$^{-1}$ (in Nujol).

In order to obtain an alkali metal salt of Formula I, the corresponding free acid ester may be dissolved in ethanol and mixed with a solution of sodium or potassium ethanolate, the mono-, di-, tri-, or tetra-alkali metal salt being obtained, depending upon the quantity of alkali metal present; in order to obtain the tetra alkali metal salt, a tertiary base, e.g., pyridine, should be present. The alkali metal salts of general Formula I are stable compounds, some of which are hygroscopic. The alkali metal salts may, however, be produced from aqueous solutions.

The resulting acid esters may, however, also be converted to the corresponding salts with organic bases, as for example ethanolamine or triethanolamine, as well as with other physiologically acceptable bases. The phosphoric acid esters of Formula I as well as their salts may be used as the substrates for fermentation tests in analytical and biochemical laboratories; the compounds I are considerably more stable than the phosphoric acid esters hitherto known for this purpose and exhibit a substantially higher affinity for animal and vegetable phosphatases than these known phosphoric acid esters.

At least some of the compounds are characterized by a strong specific inhibition of the prostate phosphatase. It was found inter alia during the tests in vitro that the prostate phosphatase p,p'-diphenyl-n-hexane-diorthophosphoric acid monoester does not split, even on incubation of several days.

The exemplified compounds are not effective as oestrogens in the Allen-Doisy test, even with very high dosages; in view of their low toxicity, they may be used, inter alia, for treating prostate diseases.

The present invention also includes pharmaceutical compositions containing, in addition to an inert carrier, a compound I.

In the following non-limitative examples all temperatures are expressed in degrees centigrade. Melting and boiling points are corrected. Unless otherwise specified, all parts are parts by weight. In every example the phosphorus oxychloride can be replaced with phosphorus oxybromide.

*Example 1*

10 parts of p,p'-dihydroxydiphenyl dissolved in 30 parts of pyridine, are added dropwise to 100 parts of boiling phosphorus oxychloride during the course of 1 hour in the absence of moisture. The reaction mixture is then cooled to about 5°, the pyridine hydrochloride precipitating. Filtration with suction is effected and thereafter the excess phosphorus oxychloride distilled off. The acid tetrachloride is heated in benzene and the benzene solution is hydrolysed with 300 parts of hot water. The aqueous solution is cooled to room temperature and extracted with ether. The water is evaporated at a bath temperature of about 60° in a water-jet vacuum. The dry residue, which is a colourless powder, is crystallized from glacial acetic acid. 10 parts of pure p,p'-diphenyl-diorthophosphoric acid monoester are obtained having a melting point of 231 to 233°.

By dissolving the resulting acid ester in ethanol and mixing the solution with an excess of the calculated amount of sodium ethanolate solution in the presence of pyridine, the tetrasodium salt is obtained.

*Example 2*

10 parts of p,p'-dihydroxy-diphenyl methane, dissolved in 30 parts of pyridine, are added dropwise to a mixture, consisting of 15.3 parts of phosphorus oxychloride and 80 parts of pyridine, cooled to 0°, in the course of 30 minutes. The reaction is conducted in the absence of moisture. The resulting pyridine hydrochloride is filtered off and the acid tetrachloride is hydrolysed with 300 parts of hot water. The water and the pyridine are thereupon distilled off in a vacuum. The dry residue (colourless crystals) are recrystallized from glacial acetic acid. 10 parts of p,p'-diphenylmethane-diorthophosphoric acid monoester are obtained, M.P. 199 to 201°.

The tetrapotassium salt is obtained as in Example 1.

*Example 3*

10 parts of p,p'-dihydroxy-diphenylethane together with 100 parts of phosphorus oxychloride are heated to the boil at reflux and in the absence of moisture. After removal of the excess phosphorus oxychloride in a vacuum, the acid tetrachloride is subjected to a fractional distillation. Boiling point 237 to 240° at 0.3 to 0.4 mm. of Hg, melting point 77 to 78°. 15 parts of acid tetrachloride are dissolved in 50 parts of benzene and are hydrolysed with 300 parts of hot water. The solution is concentrated at a bath temperature of 60° in a water-jet vacuum until crystallization occurs. The acid ester is recrystallized from glacial acetic acid. The resulting p,p'-diphenyl-ethane-diorthophosphoric acid monoester (10 parts) melts at 224 to 225°.

*Example 4*

By replacing the 10 parts of the dihydroxy compound of Example 3 with 10 parts of p,p'-dihydroxy-diphenyl-n-butane and otherwise proceeding as in Example 4, p,p'-diphenyl-n-butane-diorthophosphoric acid monoester (10 parts) having a melting point of 203 to 205° is obtained. The acid tetrachloride melts at 71 to 72°.

*Example 5*

10 parts of p,p'-dihydroxy-diphenyl-n-hexane and 100 parts of phosphorus oxychloride are heated to the boil at reflux in the absence of moisture. After removal of the excess phosphorus oxychloride in a vacuum, the acid chloride is subjected to fractional distillation. Boiling point 267 to 269° at 0.4 to 0.6 mm. of Hg. The acid tetrachloride melt at 59 to 60°. 15 parts of acid tetrachloride are dissolved in 50 parts of benzene and are hydrolysed with 300 parts of hot water. The solution is concentrated at a bath temperature of 60° in a water-jet vacuum, until recrystallization occurs. The acid ester is recrystallized from glacial acetic acid. The 10 parts of p,p'-diphenyl-n-hexane-diorthophosphoric acid are obtained, M.P. 219 to 221°.

By proceeding as in Example 1, the following salts of the free base were obtained: tetra-sodium, tetra-potassium, tetra-ethanolamine and tetra-triethanolamine.

We claim:

1. A member selected from the class consisting of phosphoric acid esters of the formula

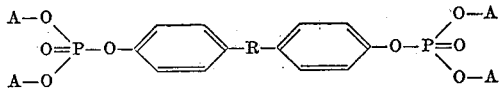

wherein

A represents a cation selected from the class consisting of hydrogen, sodium, potassium, ethanol ammonium and triethanol ammonium, with the proviso that not all the symbols need be alike, and R represents a straight polymethylene chain having from 4 to 10 carbon atoms inclusive.

2. p,p'-Diphenyl-n-butane-diorthophosphoric acid monoester.

3. p,p'-Diphenyl-n-hexane-diorthophosphoric acid monoester.

References Cited in the file of this patent
UNITED STATES PATENTS

| | | |
|---|---|---|
| 2,234,311 | Miescher et al. | Mar. 11, 1941 |
| 2,395,934 | Miescher et al. | Mar. 5, 1946 |
| 2,490,573 | Ratcliffe et al. | Dec. 6, 1949 |
| 2,826,592 | Mueller et al. | Mar. 11, 1958 |
| 2,964,552 | Hogberg et al. | Dec. 13, 1960 |

OTHER REFERENCES

Helferich et al.: "Chem. Ber.," vol. 92, pp. 2051–2056 (1959).

Adami et al.: "Chem. Abst.," vol. 53, col. 1541 (January 25, 1959).